(No Model.)
McL. CROSSLAND & D. LONG.
BARROW WHEEL.
No. 481,298. Patented Aug. 23, 1892.
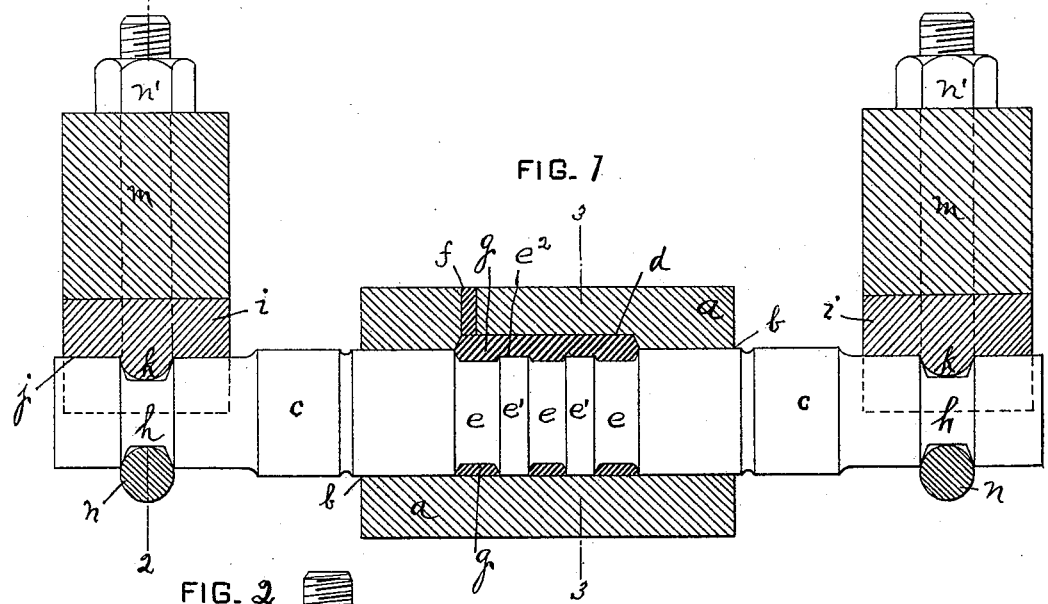
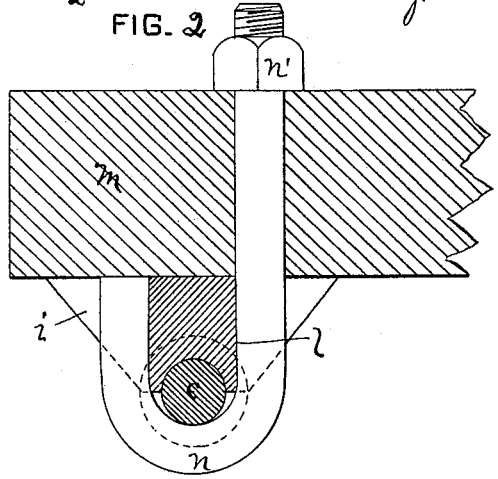
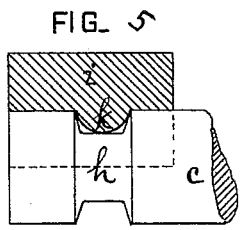
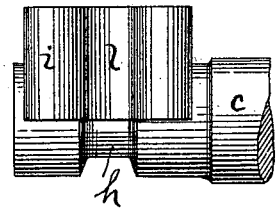
WITNESSES:
Robt. D. Totten
F. G. Kay
INVENTORS
McLain Crossland & David Long
By James F. Kay Att'y.
THE NORRIS PETERS CO., PHOTO-LITHO., WASHINGTON, D. C.

UNITED STATES PATENT OFFICE.

McLAIN CROSSLAND AND DAVID LONG, OF NEW HAVEN, PENNSYLVANIA.

BARROW-WHEEL.

SPECIFICATION forming part of Letters Patent No. 481,298, dated August 23, 1892.

Application filed August 28, 1891. Serial No. 403,936. (No model.)

*To all whom it may concern:*

Be it known that we, MCLAIN CROSSLAND and DAVID LONG, residents of New Haven, in the county of Fayette and State of Pennsylvania, have invented a new and useful Improvement in Barrow-Wheels; and we do hereby declare the following to be a full, clear, and exact description thereof.

Our invention relates to barrow-wheels, its object being to provide a strong durable wheel for use on barrows employed about mills and coke-works, where said barrows have to encounter rough handling while carrying heavy loads. For a wheel to withstand the severe wear to which it is subjected it must be so secured to its spindle as to prevent any wabbling of the wheel thereon, while the ends of said spindle must be supported in bearings capable of resisting the great strain brought thereon by the dumping of the barrow, when the whole weight of the contents of the barrow falls on one end of said spindle.

To these ends our invention consists in the manner of securing the spindle within the hub, as well as in the bearings for the spindle, all of which will be fully hereinafter set forth and claimed.

To enable others skilled in the art to make and use our invention, we will describe the same more fully, referring to the accompanying drawings, in which—

Figure 1 illustrates a hub in section and the means of securing it to the spindle, as well as a section of the bearing-blocks on the ends of said spindle. Fig. 2 is a section on the line 2 2, Fig. 1. Fig. 3 is a section on the line 3 3, Fig. 1; and Fig. 4 is a view of one of the ends of the spindle with the bearing-block thereon. Fig. 5 shows a reversible bearing-block.

Like letters indicate like parts.

The hub $a$ forms part of a wheel of any suitable construction, whether cast with the hub, spokes, and rim integral or of as many separate parts. The hub $a$ is cast with the customary opening $b$ for the passage therethrough of the spindle $c$, upon which the wheel of which the hub $a$ is a part is secured. Within the opening $b$ of the hub $a$ and in the interior face thereof is formed the seat or recess $d$. At or about the middle of the spindle $c$ are formed the annular grooves $e$. A portion of the rings $e'$, formed by the grooves $e$, is cut away, as at $e^2$, to form a flat surface, as shown in Fig. 3, for the purpose more fully hereinafter set forth. To secure the hub $a$ to the spindle $c$, said hub is first slipped on the spindle and brought to position at the middle thereof. Babbitt metal in a molten state is then poured through a runner $f$, formed in the hub $a$ and communicating with a seat or recess $d$ within said hub. The seat or recess $d$ permits the molten metal on entering the runner $f$ to pass down and fill up the annular grooves $e$ of the spindle $c$ and the seat $d$ of the hub $a$. When the Babbitt metal cools and hardens, it forms a filling $g$, which secures the hub $a$ rigidly to the spindle $c$. The metal $g$ within the seat $d$ will prevent any possibility of the rotation of the hub upon the spindle, while the annular grooves $e$ on said spindle will prevent any longitudinal movement of the hub $a$ upon said spindle $c$, so that all liability of the wabbling of the hub upon the spindle is avoided. The flattened portions $e^2$ of the rings $e'$ act to hold the metal $g$ more securely in place and prevent any liability of the rings $e'$ becoming loose in the metal $g$. The flattened portions $e^2$ form shoulders and give a stronger hold for the metal $g$. The metal $g$, entering as it does in a molten state, will seek and fill up all available space between the interior face of the hub and its spindle, so that a rigid connection is insured.

We do not confine ourselves to the use of Babbitt metal, as any other metal suitable for the purpose may be employed, provided it is a metal which when in a fixed state is very hard.

The ends of the spindle $c$ are provided with the annular grooves $h$. Bearing-blocks $i$ rest on the ends of said spindle $c$. These bearing-blocks $i$ may be formed of cast-iron or other suitable metal and are formed with the bearing-faces $j$, which fit around the upper portions of the ends of the spindle $c$. At or about the middle point of said bearing-faces $j$ of the bearing-blocks $i$ are the lugs $k$, adapted to fit snugly within the annular grooves $h$ in the ends of the spindle $c$. The sides of the bearing-blocks $i$ are recessed, as at $l$, to receive the bolt which secures the spindle and bearing-blocks $i$ to the shafts $m$ of the barrow. The bolts $n$ pass down through the shafts $m$ into the recess $l$ on one side of the bearing-block $i$, down around the spindle $c$, and fitting in the annular grooves $h$ of said spindle, and finally up through the other recess $l$ of the bearing-block to the under face of the shafts $m$ of the barrow, as shown in Fig. 2. The nuts $n'$ retain the bolts $n$ in position. This manner of securing the bearing-blocks $i$ to the spindle $c$ has many advantages. By having the bolts $n$ engage with the recesses $l$ of the bearing-blocks $i$ and at the same time with the annular grooves $h$ of the spindle $c$ when the barrow is dumped there is no liability of the bearing-blocks being displaced, while at the same time the shafts $m$ are prevented from spreading. The lugs $k$, engaging with the annular grooves $h$ of the spindle $c$, likewise prevent any possibility of the bearing-blocks slipping from their position when the barrow is dumped on one side or the other.

In Fig. 5 we have shown a bearing-block $i$ with the lug $k$ formed at a slight distance from the mid-point of the bearing-face $j$ of said block $i$. This form of construction provides a reversible bearing-block suited for barrows of different gages. It is customary to construct the barrows with the shafts to which the spindles are secured at different distances apart. In Fig. 5 the bearing-block is adjusted for a barrow of the widest gage; but it is apparent that by reversing the block $i$ the said block will be suited for a barrow of a smaller gage—that is, the distance between the ends of its shafts.

We obtain a wheel and a bearing which are peculiarly adapted for such rough usage as barrows receive in and about mills and coke-works.

What we claim as our invention, and desire to secure by Letters Patent, is—

1. In a barrow-wheel, the combination, with a spindle having grooves formed therein at or about the middle thereof and the rings formed by said grooves having flattened faces, of a hub having a seat or recess in its interior face, and Babbitt or like metal contained within said grooves, and said seat or recess, subtantially as and for the purposes set forth.

2. The combination, with a barrow-wheel, of a spindle secured thereto, bearing-blocks engaging the ends of said spindle, the bearing-faces of said bearing-blocks having lugs formed thereon adapted to enter annular grooves at the ends of said spindles, and means for holding said bearing-blocks in position on said spindle, substantially as and for the purposes set forth.

3. The combination, with a barrow-wheel, of a spindle secured thereto, bearing-blocks engaging the upper portions of the ends of said spindle, lugs on the bearing-faces of said bearing-blocks adapted to enter annular grooves at the ends of said spindle, recesses formed in the sides of said bearing-blocks, and bolts secured to the barrow-frame, adapted to enter said recesses and the annular grooves on the ends of said spindle, substantially as and for the purposes set forth.

4. The combination, with a barrow-wheel, of a spindle secured thereto, bearing-blocks engaging the ends of said spindle, the bearing-faces of said bearing-blocks having lugs formed thereon beyond the mid-point of said bearing-faces, said lugs being adapted to enter grooves at the ends of said spindle, and means for holding said bearing-blocks in position on said spindle, substantially as and for the purposes set forth.

5. The combination of a spindle $c$, secured to the hub $a$, the bearing-blocks $i$, bearing-faces $j$, lugs $k$, fitting in annular grooves $h$ of the spindle $c$, the recesses $l$ in said blocks, and the bolts $n$, secured to the shafts $m$, said bolts fitting in the recesses $l$ and annular grooves $h$, substantially as and for the purposes set forth.

In testimony whereof we, the said McLAIN CROSSLAND and DAVID LONG, have hereunto set our hands.

McLAIN CROSSLAND.
DAVID LONG.

Witnesses:
JNO. T. HOGG,
JOHN KURTZ.